United States Patent [19]

Iniotakis et al.

[11] Patent Number: 4,707,342
[45] Date of Patent: Nov. 17, 1987

[54] PROCESS FOR SEPARATION OF HYDROGEN AND/OR DEUTERIUM AND TRITIUM FROM AN INERT GAS FLOW AND APPARATUS FOR EFFECTUATION OF PROCESS IN THE COOLING GAS CIRCUIT OF A GAS-COOLED NUCLEAR REACTOR

[75] Inventors: Nicolaos Iniotakis, Julich; Claus-Benedict von der Decken, Aachen; Rudolf Hecker, Julich; Werner Fröhling, Duren; Rudolf Schulten, Aachen-Richterich, all of Fed. Rep. of Germany

[73] Assignee: Kernforschungsanlage Julich Gesellschaft mit beschrankter Haftung, Julich, Fed. Rep. of Germany

[21] Appl. No.: 381,346

[22] Filed: May 24, 1982

[30] Foreign Application Priority Data

May 21, 1981 [DE] Fed. Rep. of Germany ....... 3121125

[51] Int. Cl.$^4$ .............................................. C01B 1/26
[52] U.S. Cl. ..................................... 423/248; 55/16; 55/66; 376/314; 423/262
[58] Field of Search ...................... 55/16, 66; 423/248, 423/262; 376/314

[56] References Cited

FOREIGN PATENT DOCUMENTS 2548734 5/1977 Fed. Rep. of Germany .......... 55/16
2557908 6/1977 Fed. Rep. of Germany .......... 55/66

Primary Examiner—Melvyn J. Andrews
Attorney, Agent, or Firm—Scully, Scott, Murphy & Presser

[57] ABSTRACT

The invention relates to an apparatus for the separation of hydrogen and/or deuterium and tritium from an inert gas flow which is contaminated with hydrogen and/or deuterium and/or tritium, wherein the inert gas which is to be purified is conducted along the primary side of an exchange wall for hydrogen isotopes.

The secondary side of the exchange wall has applied thereto an agent which so chemically reacts with the permeating hydrogen isotopes that the hydrogen isotope or the hydrogen isotopes which are to separated out of the inert gas flow which is to be purified, are bound in a reaction product which is transportable in a gas flow which is not capable of permeating through the exchange wall, and wherein along the secondary side of the exchange wall there is conducted a carrier gas flow which conveys off the reaction product.

18 Claims, 3 Drawing Figures

PROCESS FOR SEPARATION OF HYDROGEN AND/OR DEUTERIUM AND TRITIUM FROM AN INERT GAS FLOW AND APPARATUS FOR EFFECTUATION OF PROCESS IN THE COOLING GAS CIRCUIT OF A GAS-COOLED NUCLEAR REACTOR

BACKGROUND OF THE INVENTION

1. Field of the Invention

The present invention relates to a process for the separation of hydrogen and/or deuterium and tritium from an inert gas flow which is contaminated with hydrogen and/or deuterium and/or tritium, wherein the inert gas which is to be purified is conducted along the primary side of an exchange wall for hydrogen isotopes, as well as relating to an arrangement for the effectuation of the process in the cooling circuit of a gas-cooled nuclear reactor.

Hydrogen (H), and its isotope deuterium (D), and tritium (T), occur as impurities, for example, in the cooling gas circuits of gas-cooled nuclear reactors in which inert gases, especially helium, are utilized as cooling gases. Thus, for example, produced in the reactor core of a high-temperature reactor (HTR) having a capacity of 500 MW$_{th}$ is a tritium quantity of about $10 \times 10^3$ Ci each year. The tritium is removed, in a known manner, in a gas purifying installation which is connected to the cooling gas circuit and which is passed through by a portion of the cooling gas so that in the cooling gas circuit there is produced an equilibrium partial pressure in the cooling gas circuit which consists of about 2 $\mu$bar, and for hydrogen between $10^2$ to $10^3$ $\mu$bar. Due to the excess of hydrogen in comparison with water and tritium in the cooling gas circuit, due to the isotope exchange in the cooling gas flow, tritium is essentially present as hydrogen-tritium molecules. The radioactive tritium in the cooling gas circuit is conducted with the cooling gas flow to the components of nuclear reactor, whose walls it can penetrate as a result of permeation. In order to avoid the thereby occasioned environmental contaminations, it is attempted to provide for the lowest possible tritium concentration in the cooling gas circuit.

2. Discussion of the Prior Art

It is known to reduce the equilibrium partial pressure for tritium, water and hydrogen through the purifying of a portion of the cooling gas flow. The branched off portion of the cooling gas flow is conveyed in a bypass conduit of the cooling gas circuit to a gas purifying installation. In the gas purifying installation, the water is quantitatively removed in the form of the $H_2O$, HDO or HTO, and the hydrogen in the form of $H_2$, HD or HT. Thereby the cooling gas flow is conducted, for example, over a cooled copper oxide bed (CuO) so that hydrogen, deuterium and tritium are oxidized and condensed. In this purifying process it is disadvantageous that only a partial gas flow in the magnitude of several parts per thousand and less than the total cooling gas flow for each cooling gas flow cycle can be purified, and thereby a satisfyingly low partial pressure for tritium is not achieved in the cooling gas circuit.

A filter for the separation of tritium is known from U.S. Pat. No. 3,848,067, in which yttrium which evidences a high retention capacity for the hydrogen isotopes, is employed for hydrogen storage. For the separation of the hydrogen isotopes from the cooling gas circuit with yttrium, the cooling gas flow is conducted along the surface of the nickel-coated yttrium so that the hydrogen isotopes will permeate through the nickel coating and will be stored in the yttrium essentially in the form of metal hydrides. Subsequent to the enrichment of the hydrogen isotopes in the yttrium, the filter must be exchanged. It is disadvantageous that the filtering effect reduces with increasing hydrogen enrichment in the yttrium, and the filter, in accordance with partial pressure conditions of the hydrogens which are to be separated from the inert gas flow, can already become ineffective within a short time.

SUMMARY OF THE INVENTION

Accordingly, it is an object of the present invention to provide a process for the separation of the hydrogen and/or deuterium and tritium from an inert gas flow, which effects a continual purification of the inert gas flow even at high quantity throughputs and higher gas temperature, with a degree of purification which remains, substantially uniform during the operating period. Moreover, the process is also simple to effect when proceeding from the continual removal of the impurities, particularly the continual removal of the tritium.

The foregoing object is achieved in a process of the above-mentioned type in that the inert gas which is to be purified is conducted along the primary side of an exchange wall for hydrogen isotopes, and wherein the secondary side of the exchange wall has applied thereto an agent which so chemically reacts with the permeating hydrogen isotopes that the hydrogen isotope or the hydrogen isotopes which are to be separated out of the inert gas flow which is to be purified, are bound in a reaction product which is transportable in a gas flow and which is not capable of permeating through the exchange wall, and wherein along the secondary side of the exchange wall there is conducted a carrier gas flow which conveys off the reaction product.

The concentrate precipitation between the primary and secondary sides of the exchange wall which is required for the permeation of hydrogen isotopes is achieved through chemical bonding of the hydrogen isotope which is to be removed in that, on the secondary side of the exchange wall, there is added an agent which chemically reacts with the hydrogen isotopes and which is so selected that the hydrogen isotope or the isotopes which are to be removed, from the inert gas flow being purified, are bound in a reaction product which is not capable of permeating through the exchange wall, which can be taken up in a carrier gas flow conducted along the secondary side of the exchange wall and is conducted off by the carrier gas flow. Adequate for the transport of the reaction product with the carrier gas is a volumetric throughput in the magnitude of per mils relative to the volumetric throughput of the inert gas flow which is to be purified. A further advantage of the inventive process consists of in that the pressure and temperature of the carrier gas flow along the secondary side of the exchange wall are correlatable with the pressure and the temperature present in the inert gas which is to be purified on the primary side.

In order to achieve a selective separation of the hydrogen isotopes, an agent is added to the carrier gas which binds the hydrogen isotope which are to be separated out through isotope exchange. For the selective separation of tritium and deuterium from a hydrogen-deuterium-tritium admixture permeating through the exchange wall, suited before all is water or, relatively, steam. The agent which is added on the secondary side of the exchange wall for isotope exchange thus contains overwhelmingly hydrogen isotopes which are not to be separated so that for these, in contrast with the hydrogen isotopes which are to be bonded, there is produced a concentration equilibrium on both sides of the exchange wall. For the isotope exchange, besides or in lieu of the preferably employed water, there can also be employed ammonia, $NH_3$, or hydrogen sulfide, $H_2S$.

During the addition of water for example, there is formed HTO and HDO from HT and HD pursuant to the reactions:

whereby through an increase in the partial pressure of $H_2O$ in the carrier gas there is advanced the transition of HT into HTO and of HD into HDO. Through a change in the quantity of the agent for the isotope exchange which is passed through on the secondary side of the exchange wall or in essence, for example, through an increase in the added quantity of water, the equilibrium weight of the reaction is displaced towards the right side of the reaction equation. Through the addition of water, or in effect water vapor into the carrier gas flow, as a result of the isotope exchange, there is attained the degree of concentration between the primary and secondary side relative to the permeation-capable HT molecule, or the HT molecule even for a volumetric throughput of the carrier gas which is small relative to the volumetric throughput on the primary side. It is sufficient to have a volumetric throughput for the carrier gas in the per mil range relative to the volumetric throughput on the primary side. $H_2O$ is contained in the gas on the primary side as well as on the secondary side of the exchange wall at the same partial pressure. Thus, it is not removed from the inert gas flow on the primary side. The reaction products which are set forth on the right-hand side in the herein above set forth equations, are conveyed away by the carrier gas from the secondary side of the exchange wall. Separated out of the carrier gas is then subsequently that reaction product which bonds the hydrogen isotope which is to be separated out or the isotopes which are to be separated out, for example, through condensation, so that any excess of agent added for isotope exchange is concurrently removed. In an advantageous manner, in gas-cooled nuclear reactors it is possible to not only selectively clean a portion but the entire cooling gas flow for each circulation from tritium and deuterium.

In order to maintain the concentration precipitate between the primary and secondary sides of the exchange wall, there can also be added to the carrier gas flow an agent which oxidizes the hydrogen isotopes. Upon the addition of such agents, during reaction with the hydrogen isotopes $H_2O$, $D_2O$, $T_2O$, formed is HDO as well as HTO which, in the same manner as in the previously described isotope exchange are conveyed away by the carrier gas flow and, for example, allow themselves to again be separated through condensation or rectification from the carrier gas flow. Preferably employed for the activation of the hydrogen isotopes is oxygen or, alternatively, a metal oxide, especially copper oxide or iron oxide, on the secondary side of the exchange wall. With the utilization of metal oxide there is purposefully formed on the secondary side a metal oxide bed through which there is conducted the carrier gas flow for conveying away the formed reaction products.

In accordance with the invention, as set forth in detail hereinbelow, the inert gas flow which is to be purified is conducted along the primary side of the exchange wall and the carrier gas flow along the secondary side of the exchange wall in counterflow in order to achieve a high degree of purification for the inert gas flow. Suitably, the carrier gas flow, subsequent to the separating out of the reaction products which are carried along by the carrier gas and, occasionally after renewed addition of the agent which reacts with the hydrogen isotopes, is reconveyed in a closed circuit to the secondary side of the exchange wall. Preferably, utilized as the carrier gas is a purified inert gas. The carrier gas, in this instance, may be withdrawn in advantageous manner from the purified inert gas flow flowing off from the primary side of the exchange wall. A portion of the purified inert gas is drawn off and, with the addition of an agent reacting with the hydrogen isotopes, is conveyed to the secondary side of the exchange surface. This manner there is concurrently achieved a pressure equilibrium, up to a low vacuum which essentially corresponds to the pressure loss, which is produced on the primary side, of the exchange wall during the throughflow of the inert gas through the exchange installation, and a temperature equilibrium between the primary and secondary sides of the exchange wall. In view thereof, during the reconveyance of the carrier gas flow subsequent to the separation of the reaction products, in the cleaned inert gas flow there is obviated the need for any required flow aggregates for the maintenance of the carrier gas flow. The agent which reacts with the hydrogen isotopes is introduced timely into the divided off partial flow of the inert gas, so that upon inflow of the carrier gas flow to the secondary side of the exchange wall there is present a concentration precipitate to the inert gas flow on the primary side of the exchange wall. It is advantageous that the carrier gas flow, after addition of the agent which reacts with the hydrogen isotopes and prior to flowing through the secondary side of the exchange wall, is conducted over a catalyst which accelerates the reaction between the added agent and the hydrogen isotopes. In order to produce the required concentration precipitates, the partial flow which is divided off from the purified inert gas as carrier gas, is also conducted prior to inlet on the secondary side of the exchange wall over a metal oxide bed, especially a copper oxide or iron oxide bed in which, possibly preceding inlet to the secondary side, there is yet added the agent which reacts with the permeated hydrogen isotopes.

In a further embodiment of the invention, the inert gas flow is sequentially conveyed through two exchange installations, wherein there is added on the secondary side of one exchange installation an agent for the isotope exchange, and on the secondary side of the other exchange installation an agent which oxidizes the hydrogen isotopes. Through this measure, there is controllable the partial pressure relationship of the hydrogen isotopes with regard to each other through selective separation during isotope exchange, for example, during the introduction of water or water vapor through separation of deuterium and tritium, as well as the absolute partial pressure of the hydrogen through oxidation of the permeated hydrogen isotopes. Preferably the inert gas which is to be purified initially passes through an exchange installation, on the secondary side of which there is oxygen is introduced into the carrier gas flow, and thereafter an exchange installation on the secondary side of which an agent for the isotope exchange is added to the carrier gas. Hereby, the carrier gas allows itself to be conveyed through the exchange installations in a counter direction to the inert gas flow which is to be purified. When for the agent which oxidizes the hydrogen isotope there is employed a metal oxide on the secondary side of an exchange installation for example copper oxide, it is suitable to separate initially the hydrogen isotopes from the inert gas flow through isotope exchange and thereafter by oxidation by flowing through of a subsequent exchange installation. In this instance, the water which is formed on the secondary side of the second exchange installation allows itself to be subsequently employed for the isotope exchange on the secondary side of the first exchange installation. A separation of the hydrogen isotopes from the inert gas flow within two sequentially traversed exchange installations, with isotope exchange and oxidation of the hydrogen isotopes, is also of significance for the purification of the cooling gas circuit of a gas-cooled nuclear reactor since, in this manner, besides the removal of the tritium from the cooling gas circuit, there is also adjustable a desired $H_2$ content in the cooling gas circuit.

BRIEF DESCRIPTION OF THE DRAWINGS

Elucidated hereinbelow is the inventive process and an arrangement for the effectuation of the process in the cooling gas circuit of a gas-cooled nuclear reactor, in which the inventive process is utilized and forms part of the invention, as set forth in the exemplary embodiments, taken in conjunction with the accompanying drawings; in which:

FIG. 2 illustrates a further embodiment of a hydrogen separating arrangement including exchange installations which are to be sequentially passed through.

DETAILED DESCRIPTION

Figure 1:
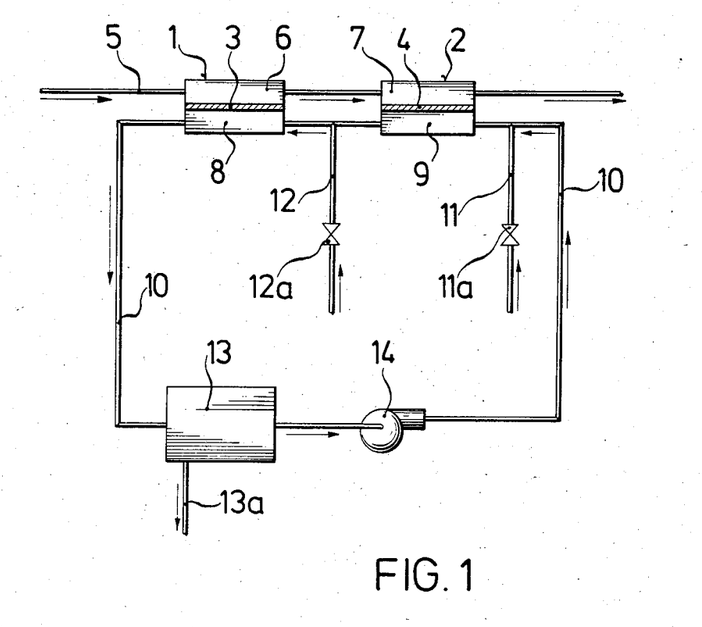
FIG. 1 illustrates a schematic block diagram of a hydrogen separating installation including exchange installations which are to be sequentially passed through by the inert gas flow which is to be purified.

FIG. 1 illustrates a hydrogen separating arrangement with two exchange installations 1, 2. The exchange installations are constructed similar to heat exchangers. Thus, for instance, there can be utilized a type of tubular bundle heat exchangers in which for example, there can be employed coiled tubes; or apparatus can be employed which is formed as a type of plate heat exchangers with flat or corrugated walls. The constructional units which otherwise serve for heat exchange are employed in the exchange installations of the hydrogen separating arrangement as exchange walls for the permeation of the hydrogen isotopes. In the drawings the exchange walls are illustrated merely schematically and identified by reference numerals 3, 4. In conformance with their purpose, the exchange walls consist of a material with high permeation capacity for hydrogen; in the shown embodiment the exchange walls are constructed from Zr. However, also coming into consideration as materials for the exchange walls are, in particular, Pd, Ta, V, Hf, Ti, as well as alloys of these metals or adjoining metal layers.

Conveyed through the two exchange installations, 1, 2 is an inert gas flow 5 which is to be purified, which flows through the exchange installations in flow chambers 6, 7 which are presently arranged on the primary side of the exchange walls 3, 4. Conducted along the secondary side of the exchange walls 3, 4 in the exchange installations through flow chambers 8, 9 is a carrier gas flow 10 in counterflow to the inert gas. In the exemplary embodiment, the carrier gas flow consists of purified inert gas, for example, of helium. However, it is also possible to utilize an inert gas as a carrier gas which is different from the carrier gas which is to be purified, for example in the purifying of helium consisting of argon, or in the event that no reactions with the exchange wall are to be expected, also nitrogen, carbon dioxide or mixtures of these gases.

Contained in the flow chamber 9 of the exchange installation 2 is water or water vapor within the carrier gas, which is introduced through a water or water vapor conduit with a throughput regulator 11a into the carrier gas flow. However, the water or the vapor can also be introduced with the same effect directly into the flow chamber 9. Within the flow chamber 8 of the exchange installation 1, the carrier gas contains oxygen which is introduced into the carrier gas through an oxygen conduit 12 having a throughflow regulator 12a therein. The oxygen can, however, also be introduced directly into the flow chamber 8. The hydrogen isotopes permeating through the exchange wall 3 during passage of the inert gases which are to be purified through the exchange installation 1, are oxidized on the secondary side of the exchange wall 3 in the flow chamber 8 and carried off by the carrier gas in the form of $H_2O$, $D_2O$ and $T_2O$, as well as HDO and HTO. In the exchange installation 1 there is thus effected a reduction in the total content of hydrogen and its isotopes in the inert gas flow, so that in the inert gas flow there is set a desired partial pressure for $H_2$.

In the exchange installation 2, through reaction with the water or water vapor contained in the carrier gas there is effected an isotope exchange, whereby formed as reaction products on the secondary side of the exchange wall 4 are $D_2O$ and $T_2O$, as well as HDO and HTO. The content of deuterium and tritium in the inert gas which is to be purified is selectively reduced in the exchange installation 2 so that deuterium and tritium are quantitatively removed from the inert gas flow. However, the $H_2$ content in the inert gas remains unchanged.

When in the exchange installation pursuant to FIG. 1 there is purified a helium gas flow of 74 kg/sec. with about 50 $\mu$bar $H_2$ partial pressure and one $\mu$bar HT partial pressure is cleaned at a temperature of 300° C. and a pressure of 40 $\mu$bar then, in the helium gas flow, the partial pressure of $H_2$ can be reduced by a factor of 4 and the partial pressure of HT by a factor of 50. Required for this purpose in the exchange installation 1 with the use of exchange walls of zircon with a wall thickness of 1 mm, an exchange surface of 270 m$^2$, and for the exchange installation 2 using the same material, an exchange surface of 700 m$^2$, wherein there is considered a permeation retardation through oxide formation on the exchange walls, which reduces permeation given for a pure zircon surface by the factor of 100. For the purification of the inert gas flow there is required in the exchange installation 2 approximately 3 tons per year of water, in the exchnage installation 1 approximately 3 tons per year of water, in the exchange installation 1 approximately $3 \times 10^2$ kmole per year of oxygen. The tritiated water quantity which is carried along by the carrier gas flow consists of about 13.5 tons per year. This water is entirely separated out of the carrier gas in a condenser 13 with a condenser outflow 13a. From the condenser 13 the carrier gas is aspirated by a blower 14 and flows back in a closed circuit to the exchange installation 2. Should the hydrogen partial pressure in the helium gas flow be reduced by a factor of 20 then, while maintaining the degree of gas purification with respect to tritium and maintaining the remaining operating parameters, the exchange surface of the exchange installation 1 is to be increased to about 600 m$^2$ and the exchange surface of the exchange installation 2 reduced to about 300 m$^2$. Thereby, required in the exchange installation 1 is approximately 20% more oxygen and, in total, about 20% more water produced each year as would be for a reduction of the partial pressure for H$_2$ by only the factor 4; however, in the exchange installation 2 on the secondary side of the exchange wall, there are only to be added about 600 kg. per year of water or water vapor.

Figure 2:
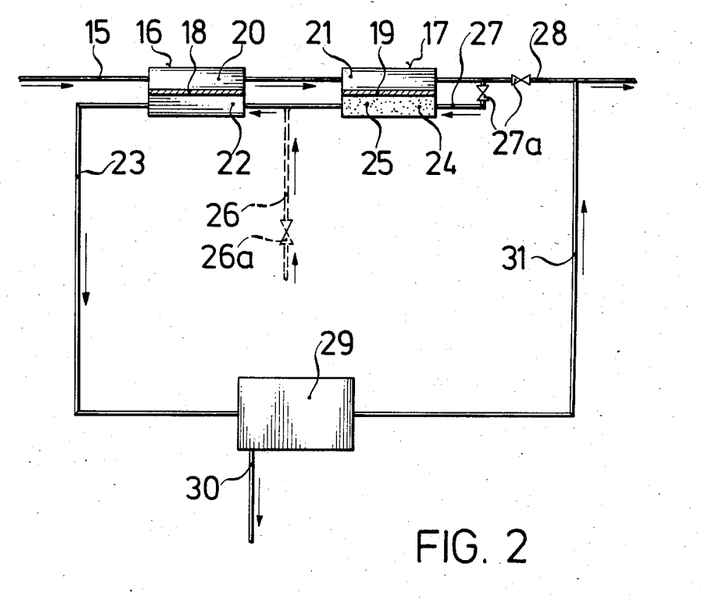

In a hydrogen separating arrangement pursuant to FIG. 2, an inert gas flow 15 passes in sequence through two exchange installations 16, 17 with exchange walls 18, 19, which can be constructed in the same manner as in the exemplary embodiment of FIG. 1 from tubes or plates or other constructional elements suitable for isotope exchange, and which in FIG. 2 are illustrated only diagrammatically. The exchange walls, as in the embodiment of FIG. 1, consist of zircon. The inert gas flow flows along the primary side of the exchange walls 18, 19 within flow chambers 20, 21. On the secondary side of the exchange wall 18, in the flow chamber 22, within the carrier gas flow 23 there is found water or water vapor for the isotope exchange with the hydrogen isotopes which permeate through the exchange wall 18; on the secondary side of the exchange wall 19 of the exchange installation 17 there is formed in the flow chamber 24, in contact with the carrier gas flowing on the secondary side of the exchange wall 19, a CuO bed 25 which is schematically indicated in FIG. 2 through phantom-lines of the flow chamber 24. In the exchange installation 17 the hydrogen isotopes which permeate through the exchange wall 19 oxidize with the formation of H$_2$O, D$_2$O, T$_2$O, as well as HDO, and HTO. Hereby, there can be utilized the water essentially produced as the reaction product for the isotope exchange in the exchange installation 16. In accordance with the design, there can thus be eliminated any water addition to the flow chamber 22 of the exchange installation 16. FIG. 2 there is thus shown in phantom-lines a water or vapor conduit 26 with through flow regulator 26a for the infeed of water terminating in the carrier gas flow 21, in order to emphasize in this manner that the water of vapor conduit 26 is not required in every instance.

The carrier gas is withdrawn from the purified inert gas flow in the hydrogen separating installation according to FIG. 2 by means of a bypass 27 conduit, and which flows out of the exchange installation 17 into a purified gas conduit 28. Arranged in the bypass conduit and in the purified gas conduit 28 are through-flow regulators 28a. The inert gas quantity which is withdrawn as carrier gas lies in the per mil range relative to the total inert gas volume flowing per unit of time within the purified gas conduit 28. During passage through the flow chamber 24, the water which is formed as a reaction product in the CuO bed 25, is conveyed along by the carrier gas, and achieved thereby in the inert gas flow in the same manner as in the embodiment of FIG. 1, is an absolute reduction in the concentration of hydrogen isotopes through oxidation, as well as through selective separation of deuterium and tritium in the exchange installation 16 a change in the partial pressure relationship of the hydrogen isotopes among each other, whereby the partial pressure for H$_2$ increases in relation to the partial pressure of the isotopes which are to be separated out.

The carrier gas flow 23 which is conveyed, in counterflow to the inert gas flow 15, through the exchange installations 16, 17 is conducted while charged with reaction products from the flow chamber 22 to a condenser 29. Within the condenser 29 tritiated water is precipitated as the reaction product and conducted off through a condensate conduit 30. The purified carrier gas flow again streams back through a return conduit 31 into the pure gas conduit 28 and is assumed by the inert gas flow.

The withdrawal of inert gas as carrier gas from the purified inert gas flow eliminates the need for a compressor or a blower which, in the embodiment of FIG. 1, conveys the carrier gas in a closed circuit. The necessary pressure differential which is required for maintenance of the carrier gas flow between the connection of the bypass conduit 27 and the connection of the return conduit 31 with the purified gas conduit 28, is generated by the conveying aggregates which are present for the conveyance of the inert gas flow which is to be purified. However, it is of significance, above all, that by means of the bypass conduit 27, in a simple manner there is attained between the primary and secondary sides of the exchange walls 18, 19 within the exchange installation 16, 17, a temperature and pressure equilibrium which, independently of small pressure differentials which result from pressure losses during the passage of the inert gas through the flow chambers 20, 21, as well as, with respect to the pressure differential in the exchange installation 17, additionally occur due to the pressure loss, which is produced during passage of the carrier gas through the flow chamber 24. On the secondary side of the exchange walls 18, 19 there will thus form a low vacuum in comparison with the primary sides of the exchange installations 16, 17.

The utilization of purified inert gases as carrier gas and the withdrawal of inert gas through a bypass conduit with the reconveyance of the purified carrier gas into the inert gas flow after the separating out of the tritiated water from the carrier gas is also possible in the embodiment of FIG. 1. In order to obtain a concentration precipitate between the primary and secondary sides of the exchange wall 4 in the exchange installation 2, it is then at all times required that the water or the water vapor in the purified inert gas which is utilized as the carrier gas is so timely introduced therein prior to entry of the carrier gas into the flow chamber 9 of the exchange installation 2, that the HT concentration in the carrier gas is sufficiently reduced through isotope exchange. The reaction can be accelerated through the addition of a corresponding catalyst. In addition, the carrier gas which has been withdrawn from the cleaned inert gas flow through the bypass conduit for reduction of the HT concentration can be conveyed, prior to the addition of water of vapor, over a CuO bed.

When the hydrogen separating installation pursuant to FIG. 2 is supplied with a helium gas flow of 74 kg/sec. under the same operating conditions as in the embodiment of FIG. 1 (gas temperature 300° C., gas pressure 40 μbar) and at the same partial pressures for $H_2$ and HT ($P_{H2}$=50 μbar, $P_{HT}$=1 μbar), then after passing through the exchange installations 16, 17, the partial pressure of $H_2$ is reduced by a factor of 4, the partial pressure of HT by a factor of 50. The therefor required exchange surfaces of zircon, at a wall thickness of 1 mm for the exchange wall 18 with isotope exchange on the secondary side of approximately 1000 m², for the exchange wall 19 with oxidation of the hydrogen isotopes approximately 275 m². In this design there is proceeded in the same manner as in the embodiment of FIG. 1, that the permeation through the exchange walls 18, 19 are reduced due to oxidation by a factor of 100 in comparison with permeation at a non-oxidized exchanged wall. The oxygen quantities required in the exchange installation 17 for oxidation of the permeated hydrogen isotopes are delivered through the reduction of the CuO bed. With the utilization of the hereby produced water, there is additionally required only approximately 1 ton of water each year. Produced in the condenser 29 during the purification of the carrier gas flow are approximately 11.5 tons per year of tritiated water.

Should the hydrogen partial pressure in the inert gas which is to be purified be reduced by the factor of 20 then, while maintaining the degree of gas purification of the inert gas flow with respect to its tritium content, and maintaining the remaining operating parameters at an increase in the exchange surface within the exchange installation 17 of from 275 to 600 m² there is entirely eliminated the quantity of water which is introduced into the exchange installation 16. Above all, in comparison with the previously described embodiment for the hydrogen separating installation pursuant to FIG. 2, the oxygen consumption is increased by about 20% which leads to the reduction of a larger CuO quantity. The exchange surface of the exchange wall 18 for the isotope exchange in the exchange installation 16 remains unchanged.

Figure 3:
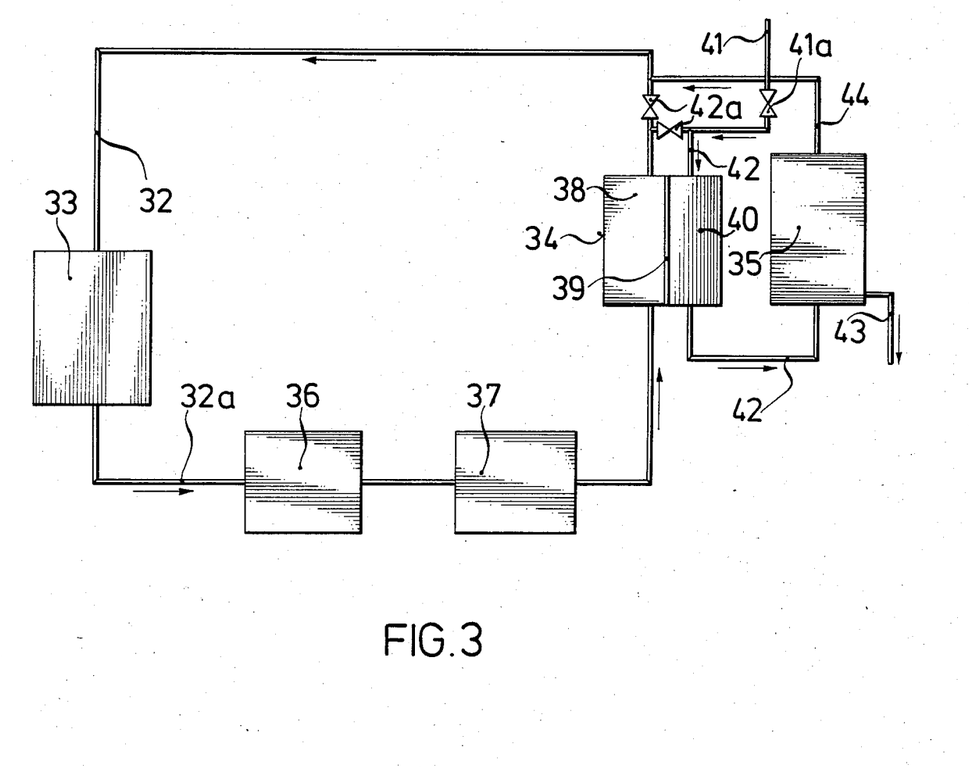
FIG. 3 illustrates a schematic block diagram showing the utilization of a hydrogen separating arrangement in the cooling gas circuit of a gas-cooled nuclear reactor.

Illustrated in FIG. 3 is a schematic block diagram for a cooling gas circuit 32 of a Type HTR gas-cooled nuclear reactor 33 with a gas purifying installation for tritium which, in the exemplary embodiment, consists of an exchange installation 34 and a conventional gas cleaning chamber 35 with a device for the separation of water, for example, a cooled CuO bed.

In accordance with the block diagram of FIG. 3, after the heating in the nuclear reactor 33 of the cooling gas streaming off in the flow direction 32a, the gas is then conveyed to the reactor components 36, 37, which serve for heat exchange and energy recovery and which can relate, for example, to heat transmitters to secondary energy carriers. The exchange installation 34 is connected in the cooling gas circuit 32 downstream of the reactor components 36, 37. The exchange installation 34 is constructed in the same manner as the exchange installations 2 and 16 in the embodiments of FIGS. 1 and 2. Thus, in the flow chamber 38 there flows on the primary side from an exchange wall 39 which consists of zircon, to the cooling gas which is to be purified of the cooling gas circuit 32; in the flow chamber 40 on the secondary side of the exchange wall 39 there is conducted carrier gas to which there is introduced water or vapor for the isotope exchange with the hydrogen isotopes which permeate through the exchange wall 39, through an infeed conduit 41 with a through-flow regulator 41a. Utilized as carrier gas is cooling gas purified as in the exchange installation pursuant to FIG. 2, which is carried off from the cooling gas circuit through a bypass conduit 42 with a through-flow regulator 42a. The infeed conduit 41 for water or vapor connects into bypass 42 still ahead of the entry of the bypass conduit 42 into the flow chamber 40 for the cooling gas which is conducted along the secondary side of the exchange wall 39, which forms the carrier gas flow, so as to thereby achieve through reaction between the introduced water and the tritium which is still contained in the cooling gas flow, a partial pressure reduction for HT in the carrier gas flow in comparison with the HT partial pressure at the output of the exchange installation 34 for the cooling gas flow streaming along the primary side. Additionally, a catalyst can be introduced into the bypass conduit 42 which accelerates the desired reaction.

The cooling gas which forms the carrier gas flow is also conveyable over a reduceable agent, such as CuO, for reduction of the concentration of HT prior to entry into the exchange installation 34 as an alternative to the previously mentioned embodiment.

Tritium is selectively removed in the exchange installation 34. The carrier gas flow which is conducted in counterflow to the cooling gas thus carries off tritiated water from the flow chamber 40. From the exchange installation 34 the carrier gas flow is conveyed through the gas cleaning chamber 35 and conventionally purified in a cooled CuO bed. The thereby formed water, together with the water which is carried along from the exchange installation 34, is separated out and conducted away through a condensate conduit 43. The carrier gas flow which is completely purified in this manner can then be again directly entrained into the cooling gas circuit. A return conduit 44 which is connected to the gas cleaning chamber 35 connects into the cooling gas circuit 32 ahead of the entry of the cooling gas into the nuclear reactor 33.

In a cooling gas circuit with helium at a throughput of 74 kg/sec. and a bypass factor of $3 \times 10^{-3}$, which indicates the cooling gas quantity flowing off at a bypass relative to the cooling gas quantity circulating in the cooling gas circuit, there reigns, without interposition of an exchange installation as is indicated in FIG. 3 by reference numeral 34, partial pressure 50 μbar for $H_2$ a partial pressure of 0.01 to 0.1 μbar for HT. When the exchange installation 34 is interposed, and the partial pressure for $H_2$ is maintained unchanged in the cooling gas circuit, then after heat exchange in the reactor components 36, 37 at a cooling gas pressure of 40 bar and a temperature of 300° C., in the exchange installation 34 the concentration of HT in the cooling gas circuit is reduced by a factor of 250. For this purpose there is required a 1 mm thick exchange wall of zircon having an exchange surface of about 700 m². For the removal of the tritium from the cooling gas circuit through ion exchange in the exchange installation 34, there are required 11.5 tons of water each year. In the gas cleaning chamber 35 there separates out the same quantity of tritiated water. The achieved reduction of the tritium content in the cooling gas circuit is sufficient to maintain the enrichment of the tritium in the secondary energy carrier caused as a result of tritium permeation in the reactor components 36, 37 below the permissible tritium concentration prescribed by safety officials.

In the cooling gas circuit pursuant to FIG. 3, besides the purification of the cooling gas flow from tritium, there can be also achieved a target control over the $H_2$ partial pressure through the sequential interconnection of two exchange installations, as is illustrated in the embodiments of FIGS. 1 and 2. Passed through in sequence by the cooling gas are then two exchange installations of which one bonds the permeated hydrogen isotopes through ion exchange and the other through oxidation into a reaction product which can be conveyed off by the carrier gas. Also such a configuration for the cooling gas purification can be combined with a conventional gas cleaning chamber with a cooled CuO bed, through there is attainable a substantially more satisfactory purifying effect than was known heretofore.

In the embodiment according to FIG. 3, the exchange installation 34 is interposed in the cold gas region. When any charging of the reactor components 36, 37 be completely avoided by means of tritium which is produced in the reactor core, then the exchange installation, or a plurality of sequentially connected exchange installations, can also be interposed in the hot gas region of the cooling gas circuit between nuclear reactor 33 and the reactor components 36, 37. Due to the low vacuum on the secondary side of the exchange walls in comparison with the primary side, a safeguard is afforded also in the case of a rupture of the exchange walls. Thus, the water which is produced on the secondary side can penetrate into the cooling gas circuit at the rupture locations only through slow diffusion processes which, for the case of a rupture, does not render necessary a rapid deactivation of the reactor. When the nuclear reactor installation consists of a plurality of cooling gas loops, then pursuant to need, in one portion of the loops or in all loops there can be interposed exchange installations so that, for example, in a few of the loops there can be located exchange installations for tritium removal through isotope exchange, and in other loops exchange installations for the oxidation of the permeated hydrogen isotopes.

Should there be changed the entire quantity of the hydrogen isotopes in the cooling gas circuit, which are to be separated out then in the exchange installations there are to be correlated, on the one hand, the exchange surface and, on the other hand, the quantity of materials to be introduced whereby, at an increase in the total quantity which is to be separated out while maintaining of all other parameters, the exchange surface as well as the material quantity are to be increased, as is described on the basis of the examples for the hydrogen separating installation pursuant to FIGS. 1 and 2. In order to purify inert gas which is contaminated with hydrogen isotopes, it is understandably also possible within the scope of the invention to allow the inert gas to flow in a closed circuit a number of times through an exchange installation, and to deplete the hydrogen isotopes continuously in the inert gas flow in a number of flow cycles. Hereby, for example, the exchange surface required for the separation of the hydrogen isotopes can be held small in comparison with inert gas flow which is to be purified.

With an increasing $H_2$ partial pressure in the primary gas and in the presence of primary gas impurities (for example, CO, $CH_4$, $H_2O$—), in order to avoid a hydride formation as well as a passivation of the exchange surface, it is recommended to employ Pd, or relatively Pd-Ag (75%, 25%) as the exchange surface in the form of a membrane or foil.

We claim:

1. In a process for the separation of hydrogen and hydrogen isotopes from an inert gas flow which is contaminated with (i) hydrogen and at least one hydrogen isotope selected from deuterium and tritium or (ii) at least one hydrogen isotope selected from deuterium and tritium or (iii) a mixture of deuterium and tritium, wherein the inert gas which is to be purified is conveyed along the primary side of an exchange wall for hydrogen isotopes, said exchange wall having a secondary side; the improvement comprising: adding an agent on the secondary side of the exchange wall which chemically reacts with the permeating hydrogen isotopes so as to bond the hydrogen isotope or isotopes which are to be separated out of the inert gas flow being purified into a reaction product transportable in a gas flow which is not permeable through said exchange wall, and conveying a carrier gas flow along the secondary side of the exchange wall for conducting away of the reaction product.

2. Process as claimed in claim 1, comprising adding an agent for bonding the hydrogen isotopes which are to be separated through isotope exchange.

3. Process as claimed in claim 2, comprising adding water or water vapor.

4. Process as claimed in claim 1, comprising adding an agent for oxidizing the permeating hydrogen isotopes.

5. Process as claimed in claim 4, comprising adding oxygen.

6. Process as claimed in claim 4, wherein said agent for oxidizing the permeating hydrogen isotopes is a metal oxide.

7. Process as claimed in claim 6, wherein said metal oxide is selected from the group consisting of copper oxide and iron oxide.

8. Process as claimed in claim 1, comprising conducting the inert gas flow along the primary side and the carrier gas flow along the secondary side of the exchange wall in countercurrent flow.

9. Process as claimed in claim 1, comprising separating the reaction product bonding the hydrogen isotopes from the carrier gas flow, and reconveying the carrier gas flow in a closed circuit to the secondary side of the exchange surface.

10. Process as claimed in claim 9, comprising separating the reaction product through condensation from the carrier gas flow.

11. Process as claimed in claim 1, comprising utilizing a purified inert gas as the carrier gas.

12. Process as claimed in claim 11, comprising withdrawing a portion of the purified inert gases flowing off the primary side of the exchange surface, adding an agent for reacting with the hydrogen isotopes, and conveying said gas as carrier gas to the secondary side of the exchange surface.

13. Process as claimed in claim 12, comprising conveying the carrier gas flow subsequent to addition of said agent and prior to contacting the secondary side of the exchange surface over catalyst for accelerating the reaction between the agent and the hydrogen isotopes.

14. Process as claimed in claim 11, comprising conveying the carrier gas flow over metal oxide prior to contacting the secondary side of the exchange surface.

15. Process as claimed in claim 1, comprising conveying the inert gas flow which is to be purified in sequence through two exchange installations, adding an agent for isotope exchange on the secondary side of one exchange installation, and adding an agent for oxidizing the hydrogen isotopes on the secondary side of the second exchange installation.

16. Process as claimed in claim 15, comprising conducting the carrier gas flow along the secondary side of each exchange installation sequentially through the exchange installation in counterflow to the inert gas flow which is to be purified.

17. Process as claimed in claim 15 or 16, comprising conveying the inert gas flow which is to be purified through a first exchange installation in which oxygen is added on the secondary side thereof, and thereafter conveying said gas flow through a second exchange installation in which an agent is introduced on the secondary side for the isotope exchange.

18. Process as claimed in claim 15 or 16, comprising conveying the inert gas flow through a first exchange installation in which an agent for isotope exchange is added on the secondary side thereof, and thereafter conveying said gas flow through a second exchange installation in which a metal oxide is added on the secondary side.

* * * * *

UNITED STATES PATENT AND TRADEMARK OFFICE
CERTIFICATE OF CORRECTION

PATENT NO. : 4,707,342

DATED : November 17, 1987

INVENTOR(S) : Nicolaos Iniotakis, et al.

It is certified that error appears in the above-identified patent and that said Letters Patent is hereby corrected as shown below:

Column 7, line 63: "28a" should read as --27a--

Signed and Sealed this

Ninth Day of August, 1988

Attest:

DONALD J. QUIGG

Attesting Officer

Commissioner of Patents and Trademarks